May 9, 1950  A. E. REEVES  2,506,649
FILM FEED MECHANISM
Filed Feb. 8, 1947  3 Sheets-Sheet 1
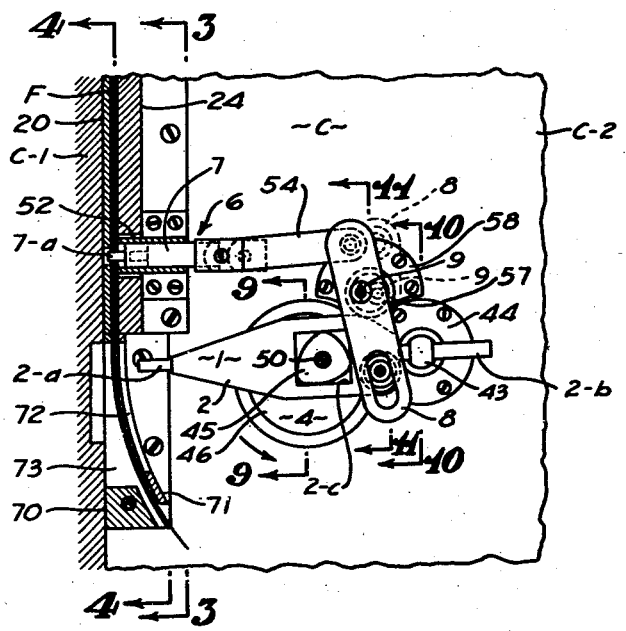
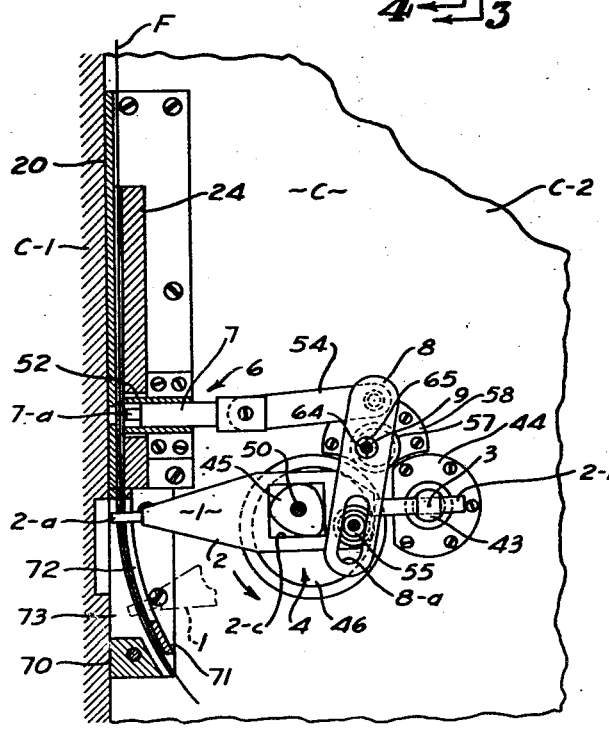
INVENTOR
Arthur E. Reeves
BY John Flam
ATTORNEY

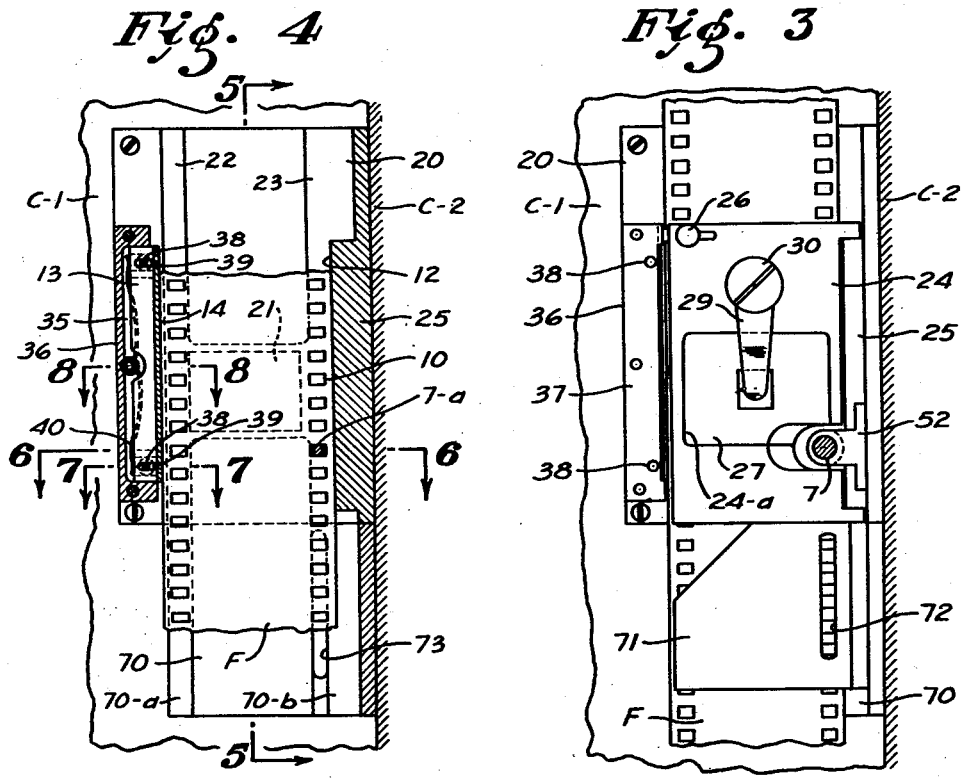
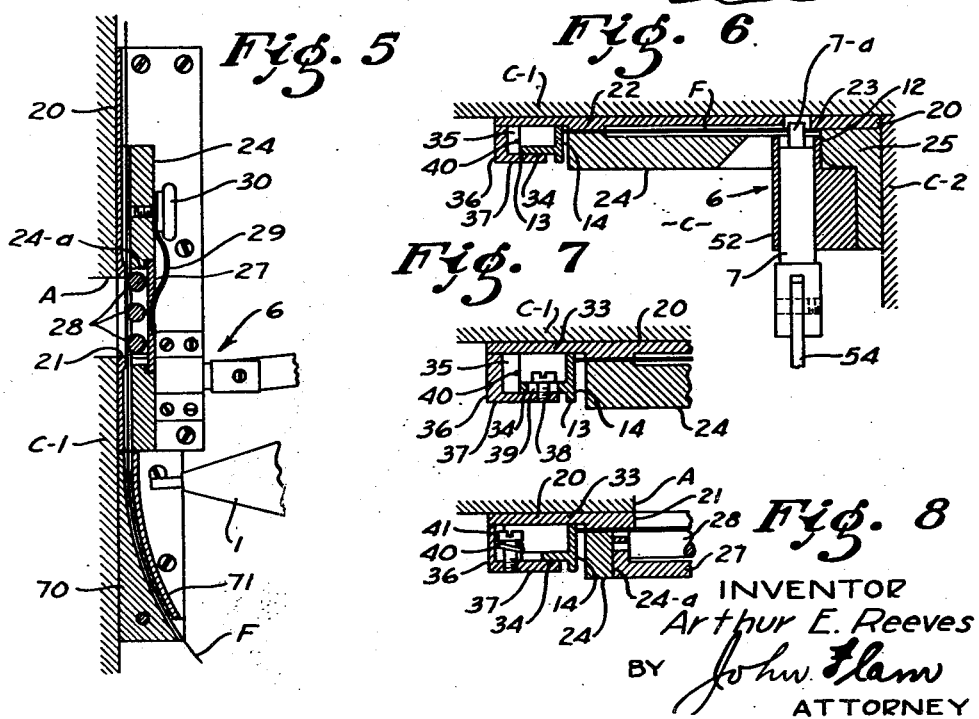

May 9, 1950 A. E. REEVES 2,506,649
FILM FEED MECHANISM
Filed Feb. 8, 1947 3 Sheets-Sheet 3

INVENTOR
Arthur E. Reeves
BY John Flam
ATTORNEY

Patented May 9, 1950

2,506,649

UNITED STATES PATENT OFFICE 2,506,649

FILM FEED MECHANISM

Arthur E. Reeves, Los Angeles, Calif.

Application February 8, 1947, Serial No. 727,447

4 Claims. (Cl. 88—18.4)

1

This invention relates to film feeding mechanism for motion picture cameras, or the like.

Mechanism for this purpose usually comprises a claw member for advancing the film past an optical aperture in a step-by-step manner, and a pilot member for anchoring the film between successive stops of advance. In such mechanism, the members are caused to engage the film alternately so that it is restrained at all times.

It is an object of this invention to provide improved mechanism of this type.

It is another object of this invention to provide mechanism of this type having improved means for positioning the film in a lateral direction.

It is another object of this invention to provide film feed mechanism, comprising a claw or advancing member and a pilot or anchoring member and which requires but one row of sprocket holes. Thus, such mechanism may be used with either standard 35-mm. film, 16-mm. film having a sound track, or 8-mm. film.

It is another object of this invention to provide such mechanism having improved means for facilitating threading of the film through the mechanism.

It is still another object of this invention to provide such mechanism wherein the pilot or anchoring member optionally may be rendered inoperative, so that it does not engage the film without affecting the operation of the film advancing means. Thus, film may be used in which the spacing of the sprocket holes is inaccurate, such, for example, as film which has shrunk.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

In the drawings:

Figure 1 is an elevation, partly in section, showing a film feed mechanism incorporating the features of the invention;

Fig. 2 is a similar view, showing the parts in a different operating position;

Figs. 3 and 4 are transverse sections, taken substantially as indicated by the correspondingly numbered lines of Fig. 2;

Fig. 5 is a longitudinal section, taken substantially as indicated by line 5—5 of Fig. 4;

Fig. 6 is a cross section on an enlarged scale, taken substantially as indicated by line 6—6 of Fig. 4;

2

Figure 9:
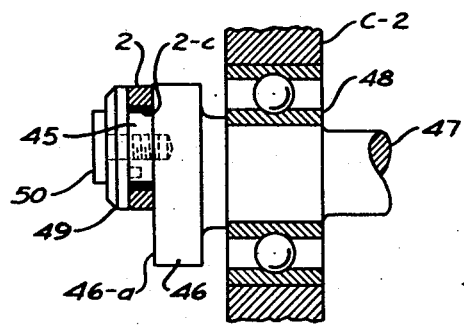
Figure 10:
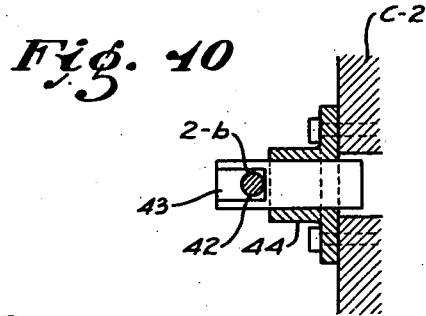
Figures 11, 12:
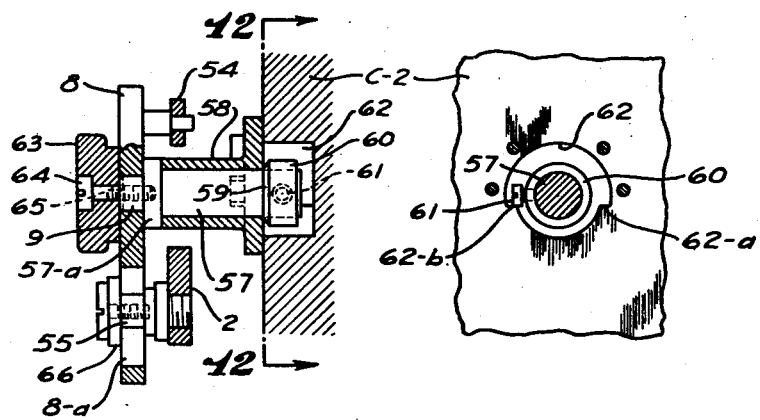

Figs. 7 and 8 are detail cross sections on a further enlarged scale, taken substantially as indicated by the correspondingly numbered lines of Fig. 4;

Figs. 9, 10 and 11 are transverse sections on an enlarged scale, taken substantially as indicated by the correspondingly numbered lines of Fig. 2; and Fig. 12 is a longitudinal section taken substantially as indicated by line 12—12 of Fig. 11.

Referring to Fig. 1 of the drawings, the claw or film advancing member is indicated generally by the numeral 1, and comprises a relatively thin flat arm 2 supported for angular and radial movement with respect to a fixed point 3, and having a reduced end portion 2—a adapted to engage a sprocket hole in the film F. The claw 1 is operated by rotary cam means 4, and is shown in Fig. 1 just after having been moved into engagement with the film F. The cam 4 rotates counterclockwise, so that movement of the cam from the position of Fig. 1 will cause the claw 1 to move to the broken-line position, advancing the film F downwardly a distance equal to one frame. Further rotation of the cam 4 causes the claw member 1 to disengage the film, thereafter moving upwardly to the position of Fig. 2, and re-engaging the film as shown in Fig. 1. Thus, the film F is advanced in a step-by-step manner.

The anchoring member or pilot pin is indicated by the numeral 6, and comprises a member 7 guided for horizontal movement and having a reduced end portion 7—a adapted to engage a sprocket hole in the film F as the claw 1 releases the film. For this purpose, a lever 8 is supported for angular oscillation by a pivot member 9 intermediate its ends which respectively are coupled to the claw 1 and to the pilot pin 6 so that, as the claw 1 is moved out of engagement with the film, the pilot pin 6 is moved into engagement with the film, and vice versa. Obviously, it is necessary that the pilot pin 6 be spaced a distance from the film engaging end 2—a of the claw 1, when moving to engage or disengage the film F, by a distance equal to the spacing of an appropriate, integral number of sprocket holes.

As clearly shown in Fig. 4, the pilot pin end 7—a has a rectangular section, with a height closely corresponding with the height of the film sprocket holes 10, but of less width. The claw end 2—a has a similar cross section. Thus, the claw 1 and the pilot pin serve to locate successive frames on the film F accurately in the direction in which the film travels, but not in a lateral direction.

For laterally positioning the film, an accurate guiding surface 12 (Figs. 4 and 6), extending in the direction of movement of the film is provided for engaging one edge of the film F. A spring-pressed pressure shoe 13 (Figs. 4, 6, 7 and 8) is provided having a surface 14 which, by engaging the opposite edge of the film F, resiliently maintains the film against the guide surface 12.

In the normal operation of the mechanism, the film F is always engaged either by the pilot pin 6 or by the claw 1. To facilitate threading of the film through the feed mechanism, provision is made so that one of these members may be moved optionally to disengage the film at the same time that the other member is out of engagement with the film. It is preferred that the pilot pin member 6 be arranged for such optional movement.

For this purpose the pivot 9 is made adjustable toward and away from the film. Thus, referring to Fig. 2, in the full line position of the pivot 9, the pilot pin 6 engages the film F just before the claw 1 releases it. In the broken line position of the pivot 9, the pilot pin 6 is moved away from the film a sufficient distance so that, when operated by the lever 8 in response to movement of the claw 1, the pilot pin does not engage the film. The pilot pin 6 can be moved to such inoperative position not only to facilitate threading of the film, but also to permit use of film wherein the spacing of the sprocket holes is inaccurate, since the normal operation of the claw 1 is not interfered with.

As is well understood, unexposed film usually is drawn by the feed mechanism from a magazine or reel (not shown) and caused to pass accurately an aperture through which the desired scene is focused on the film. The feed mechanism delivers the exposed film into a light-tight compartment provided in the camera casing, or the like, from which the film is wound on another reel (not shown). In the present instance part only of the light compartment indicated by the letter C (Figs. 1 and 2) is shown, a portion of the front wall thereof being indicated by C—1 having the image aperture A (Fig. 5) therein. A portion of one of the side walls is indicated by C—2, and serves to mount the feed mechanism.

Referring particularly to Figs. 3, 4, 5, and 6, a guide plate 20, appropriately secured to the walls C—1 and C—2, is provided with an opening 21 for passing the image from the aperture A to the film F, which is slidingly confined against the raised rails 22 and 23 (Figs. 4 and 6) on the plate 20 by the gate member 24. This gate 24 is hinged to an elongated boss 25 on the plate 20 for movement toward and away from the film F, a spring latch 26 serving to hold the gate 24 in film-confining position.

A pressure plate 27, freely slidable in an opening 24—a provided in the gate 24, carries a plurality of rollers 28 adapted to engage the entire width back of the film F where it passes over the opening 21. A leaf spring 29, secured at one end to gate 24 as by a screw 30, urges the plate 27 so that the rollers 28 resiliently confine the film against the plate 20 adjacent the opening 21.

The elongated boss 25 provides the guide surface 12 which, as previously mentioned, serves to position the film F accurately in a lateral direction by slidably engaging one edge of the film, which is resiliently urged against the surface 12 by the shoe 13.

It is to be understood that the force exerted by the shoe 13 is relatively light, so that no appreciable frictional resistance is offered to the advancing movement of the film.

Referring to Figs. 4, 6, 7 and 8, the shoe 13 is shown as having a wall 33 extending in a direction normal to the plate 20 and a wall 34 parallel with the plate 20, and is slidably secured within a cavity 35 of a member 36 secured to the plate 20. Thus, the member 36 has a wall 37 which overhangs the wall 34 and, adjacent the opposite ends thereof, is provided with screws 38 which extend respectively through slots 39 in the wall 34. As clearly shown in Fig. 7, the heads of screws 38 maintain the wall 34 of the shoe 13 in sliding contact with the wall 37. Thus, the shoe 13 is secured to the plate 20 for limited movement toward and away from the film F by the member 36.

A light bar spring 40 is secured within member 36 as by having its mid-portion bent to encircle a screw 41 secured within the member 36 (see Fig. 8), the free ends of the spring 40 engaging respectively the opposite end portions of the shoe 13 (see Figs. 4 and 6) and urging it outwardly of the member 36.

The arm 2 of the claw member 1 has a reduced rod-like extension 2—b at the end opposite to that carrying the film engaging projection 2—a (see Figs. 1 and 2). This extension 2—b is freely slidable in a transverse opening 42 provided in a pin 43 supported for free angular and axial movement in a bearing member 44 secured to the wall C—2 (see Fig. 10).

Intermediate its ends, the arm 2 is provided with a rectangular opening 2—c for accurately engaging a three pointed cam 45 eccentrically mounted on a crank disc 46 (see Figs. 1, 2 and 9). As shown in Fig. 9, the disc 46 is secured to one end of a shaft 47 rotatably supported by suitable bearings, one of which is shown at 48, and arranged to be driven by suitable means (not shown).

As clearly indicated in Fig. 9, the cam 45 has a thickness substantially equal to that of arm 2, a small running clearance only being provided. Thus, the outer face 46—a of the crank disc 46 serves to locate the arm 2 laterally of the film F. Since the support pin 43 is unrestrained axially, it can adapt itself readily as required by the arm 2, thus greatly facilitating the machining operations and assembly of the mechanism.

As shown in Fig. 9 a retaining washer 49, secured by a screw 50, serves to retain the arm 2 on the cam 45.

The pilot pin or anchoring member 7 is guided for movement in a direction normal to the film by a guide member 52 secured on the plate 20 (see Figs. 1, 2, 3, 5, and 6) and is connected for operation in response to movement of the arm 2 by a lever member 8, as previously mentioned. The upper end of lever 8 is pivotally joined to one end of a link 54, the opposite end of which is pivotally joined to the member 7. The lower end portion of the lever 8 has a slot 8—a for accommodating a circular boss or projection 55 secured on the arm 2.

The boss 9 which pivotally supports the lever 8 is eccentrically formed or otherwise mounted on a supporting member 57 (see Figs. 1, 2, and 11), which is rotatably supported by a bearing member 58 secured on the wall C—2. As shown in Fig. 11, the member 57 has a flange 57—a urged against the outer face of the bearing 58, as by a spring washer 59 confined between the inner face of the bearing 58 and a collar 60 secured on the inner end of the member 57 by a set screw 61.

The wall C—2 has a recess 62 formed therein for accommodating the inner end of the member 57. Further, as shown in Fig. 12, this recess 62 may have shoulders 62—a and 62—b formed therein which are adapted, by engagement with the set screw 61, to limit the angular movement of the eccentric member 57.

A knurled thumb nut 63, secured to the boss 9 as by a screw 64 and key 65, serves to retain the lever 8 on the boss, as well as to impart manual angular movement to the supporting member 57. A washer 66 also is secured to the boss 55 for guiding the slotted portion of the lever 8.

The operation of the mechanism may now be reviewed. With the crank disc 46 rotating counter-clockwise (Figs. 1 and 2), the claw member 1 will be moved downwardly from the full line position of Fig. 1 to the broken line position, advancing the film a distance of one frame. Such downward movement does not substantially affect the pilot pin 7 which remains disengaged from the film. Since the claw member 1, during this movement, swings substantially radially about the point 3, an extension 70 is provided below the plate 20 having film-supporting rails 70—a and 70—b curved about the point 3 for maintaining the film F in engagement with the claw member 1. A cover plate 71 is provided for maintaining the film on the rails 70—a and 70—b and has a slot 72 for accommodating the film-engaging pin 2—a of the claw 1. A similar clearance slot 73 is provided in the extension 70.

From the broken line position of Fig. 1, the claw member 1 will be withdrawn from the film, such movement being transmitted by the lever 8 to the pilot member 7 causing the pin 7—a to engage the film. The claw will then move to the upper limit of its movement (substantially as shown in Fig. 2), such upward movement having substantially no effect on the pilot member 7. The member 1 is then moved to engage the film F, (Fig. 1) such movement causing withdrawal of the pilot pin 7—a, releasing the film for another advance.

By manipulating the knob 63 to rotate the support 57 a half a turn from the position shown in Figs. 1, 11, and 12 to the broken line position of Fig. 2, the pilot pin 7—a will be maintained out of engagement with the film for all positions of the claw member 1. At the same time, operation of the claw member 1 is not affected.

Thus, the mechanism can be employed with film having inaccurately spaced sprocket holes, the frictional drag on the film F created by the spring-pressed shoe 13 serving to restrain the film between successive steps of advance.

The inventor claims:

1. In film feed mechanism: a claw member for advancing strip film in a step-by-step manner, and movable toward and away from the film; a pilot member movable to anchor the film between successive steps of advance; means forming an operating connection between said members, comprising a lever connected at spaced points to said members respectively; means forming a pivot mounting said lever and a cylindrical member having said pivot formed thereon eccentrically with respect to the axis of said member, and angularly movable to alter the position of the pivot to render said pilot member ineffective to engage the film; and friction means for holding said cylindrical member in the angular positions to which it has been moved.

2. In a film feed mechanism: means comprising a claw member engageable in film apertures on one side of a strip of film to feed said film intermittently; means comprising a pilot member engageable in the film apertures on the same side of said strip film to hold the film between successive feeding movements by said claw member; the portions of said members entering said film apertures having a substantially lesser width than the width of said apertures; guide means forming a fixed guiding surface for that edge of said film adjacent the apertures in which said claw and pilot members are engageable; movable guide means forming a guide surface for the other side edge of said film; means for urging said movable guide means continuously toward said fixed guide means; and a film gate pivoted on said fixed guide means.

3. In film feed mechanism: a claw member for advancing strip film in a step-by-step manner; a pilot member movable to anchor the film between successive steps of advance; means forming an operating connection between said members, comprising a lever connected at spaced points to said members, respectively; a cylindrical member having an eccentrically disposed pivot mounting said lever, said cylindrical member being angularly movable to alter the position of the pivot to render said pilot member selectively effective or ineffective to engage the film; supporting means in which said cylindrical member is mounted; and a spring frictionally engaging said supporting means and cylindrical member to hold said cylindrical member in the angular positions to which it has been moved.

4. In film feed mechanism: a claw member for advancing strip film in a step-by-step manner; a pilot member movable to anchor the film between successive steps of advance; means forming an operating connection between said members, comprising a lever connected at spaced points to said members, respectively; a cylindrical member having an eccentrically disposed pivot mounting said lever, said cylindrical member being angularly movable to alter the position of the pivot to render said pilot member selectively effective or ineffective to engage the film; supporting means in which said cylindrical member is mounted, said supporting means having an aperture terminating in spaced stops; and means on said cylinder member engageable with said stops to locate said pilot member in effective or ineffective position upon angular movement of said cylindrical member.

ARTHUR E. REEVES.

REFERENCES CITED

The following references are of record in the file of this patent:

UNITED STATES PATENTS

| Number | Name | Date |
|---|---|---|
| 1,491,946 | Crocker | Apr. 29, 1924 |
| 1,509,556 | Howell | Sept. 23, 1924 |
| 1,767,846 | Howell | June 24, 1930 |
| 1,781,945 | Case | Nov. 18, 1930 |
| 1,840,353 | Fear | Jan. 12, 1932 |
| 1,850,955 | Fear | Mar. 22, 1932 |
| 1,884,609 | Dina | Oct. 25, 1932 |
| 1,954,885 | Mitchell et al. | Apr. 17, 1934 |
| 2,229,924 | Howell | Jan. 28, 1941 |
| 2,374,486 | Howell | Apr. 24, 1945 |
| 2,423,925 | Biddle | July 15, 1947 |
| 2,427,327 | Nemeth | Sept. 9, 1947 |

FOREIGN PATENTS

| Number | Country | Date |
|---|---|---|
| 11,496 | Great Britain | May 17, 1913 |
| 187,005 | Great Britain | Oct. 9, 1922 |